(12) United States Patent
Damitz et al.

(10) Patent No.: US 7,047,122 B2
(45) Date of Patent: May 16, 2006

(54) EXTRAPOLATION METHOD FOR THE ANGLE-OF-ROTATION POSITION

(75) Inventors: Jens Damitz, Illingen (DE); Joachim Palmer, Korntal-Muenchingen (DE); Ruediger Fehrmann, Leonberg (DE); Matthias Schueler, Steinheim-Hoepfigheim (DE); Alexander Schenck Zu Schweinsberg, Schwieberdingen (DE); Arnold Engber, Gross-Umstadt (DE); Thomas Steinert, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/090,659

(22) Filed: Mar. 25, 2005

(65) Prior Publication Data

US 2005/0212508 A1    Sep. 29, 2005

(30) Foreign Application Priority Data

Mar. 26, 2004  (DE) .................. 10 2004 015 038

(51) Int. Cl.
*G06F 19/00*   (2006.01)
(52) U.S. Cl. ...................... 701/101; 701/110
(58) Field of Classification Search .......... 701/101, 701/110, 111, 115, 116
See application file for complete search history.

(56) References Cited

U.S. PATENT DOCUMENTS

| | | | | |
|---|---|---|---|---|
| 4,162,667 A | * | 7/1979 | Kawai et al. | 123/406.63 |
| 4,379,333 A | * | 4/1983 | Ninomiya et al. | 701/105 |
| 4,585,404 A | * | 4/1986 | Barata | 418/61.1 |
| 5,019,988 A | * | 5/1991 | Glehr | 701/101 |
| 6,216,669 B1 | * | 4/2001 | Aoki | 123/406.65 |
| 2005/0212508 A1 | * | 9/2005 | Damitz et al. | 324/207.2 |

FOREIGN PATENT DOCUMENTS

DE    100 17 107    10/2001

\* cited by examiner

*Primary Examiner*—John T. Kwon
(74) *Attorney, Agent, or Firm*—Kenyon & Kenyon, LLP

(57) ABSTRACT

A method is described for determining the angle-of-rotation position ($\phi$) of a shaft of an internal combustion engine, in particular a crank angle ($\phi$) of a crankshaft, information at least about incremental angles of rotation ($\Delta\phi$) of the shaft and running times (T) for each incremental angle of rotation ($\Delta\phi$) being detected on the basis of signals which indicate the rotation of the shaft and are spaced with intervals between them, and stored at least temporarily the instantaneous angle-of-rotation position ($\phi$) being determined in the period of time between two signals by extrapolation of the angle-of-rotation position ($\phi$) thus detected, taking into account at least one angular velocity ($\omega$) and/or change in angular velocity ($\Delta\omega$) extrapolated from the stored information. In addition, a corresponding device is also described.

13 Claims, 2 Drawing Sheets

EXTRAPOLATION METHOD FOR THE ANGLE-OF-ROTATION POSITION

FIELD OF THE INVENTION

The present invention relates to a method for determining the angle-of-rotation position of a shaft of an internal combustion engine, in particular the crank angle of a crankshaft, information at least regarding incremental angles of rotation of the shaft and running times for each incremental angle of rotation being detected and stored at least temporarily on the basis of signals occurring at time intervals, indicating the rotation of the shaft. Furthermore, the present invention relates to a device for determining the angle-of-rotation position of a shaft of an internal combustion engine, in particular the crank angle of a crankshaft.

BACKGROUND INFORMATION

Methods for determining the angle-of-rotation position of a shaft of an internal combustion engine are known. In the case of a crankshaft in particular, determination of the crank angle is of great importance because important sequences in operation of the internal combustion engine, e.g., fuel injection or generation of an ignition spark, are usually controlled individually for each cylinder as a function of the crank angle. To determine the crank angle, it is known, for example, that incremental sensors may be provided on the crankshaft and/or camshaft. These are usually sensor disks, i.e., sensor wheels, having incremental marks which in interaction with a sensor in a stationary position in relation to the engine block permit a determination of the angle-of-rotation position of the crankshaft. The incremental marks on the sensor disk are often designed as a sequence of teeth and both spaces, and the changes between tooth and that tooth space and/or tooth space and tooth, i.e., the tooth flanks, are detected as tooth signals by a sensor. It is also known that an enlarged tooth space, i.e., a tooth gap, may be created by omitting at least one tooth, and the absolute angle of the shaft may be determined with each revolution of the shaft on the basis of this tooth gap.

In the methods for determining the crank angle, 6°-sensor wheels having a tooth gap are often used. These are sensor wheels which have a sequence of 3°-wide teeth and 3°-wide tooth spaces, with a total 15°-wide tooth gap being created at a position along the circumference by omission of two adjacent teeth. Such a sensor wheel has a total of 58 teeth. However, the maximum possible resolution with this configuration is not sufficient for modern methods in which the crank angle is used as a processing parameter. DE 100 17 107 A1 describes a method in which precise angles are determined from the time difference between two successive teeth, these angles not being affected by tolerances in the sensor wheel. However, this reliable method does not allow any improvement beyond the limits of resolution due to the design.

SUMMARY OF THE INVENTION

Due to the fact that the instantaneous angle-of-rotation position in the period of time between two signals is determined by extrapolation of the detected angle-of-rotation position, taking into account at least one angular velocity and/or change in angular velocity extrapolated from the stored information, the resolution of the angle-of-rotation position and/or the crank angle may be improved considerably. To achieve a greater accuracy in determining the crank angle when using a sensor wheel, as described above, the curve of the crank angle should thus be extrapolated, i.e., it should be estimated which values the angle-of-rotation position, i.e., the crank angle, will assume until the next tooth signal is received and thus an exact allocation of the crank angle to time may again be performed. Using the present invention, an angle-synchronous determination of values may be performed with a greater precision even in the event of highly dynamic changes in rotational speed. It should be pointed out that determination and storage of incremental angles of rotation may be omitted if the incremental angle of rotation is otherwise known, e.g., due to the equal tooth spacings and a determination of the tooth gap on the basis of a comparison of tooth times.

To reduce the influence of short-term fluctuations in rotational speed, mean values are advantageously formed for the angular velocity and/or the change in angular velocity.

In an advantageous embodiment, a period is defined for repeating sequences during operation of the engine and information from the instantaneous period and/or at least one previous period is analyzed for the extrapolation. Thus, this makes use of the fact that although the engine performance may vary markedly within one period, the course of such variations is similar for different periods which are selected as being suitable. The extrapolation may be improved with this information.

The period is advantageously selected as a working cycle of the engine, as one revolution of the crankshaft or as a firing interval. A working cycle is defined as a period of time between an ignition point of a certain cylinder to the next ignition point of the same cylinder, while the firing interval is the period of time from the ignition point of one cylinder to the ignition point of the next cylinder. In these periods, the similarity described above is great and values from a previous period are particularly relevant.

An advantageous embodiment is obtained by the fact that a desired resolution of the angle-of-rotation position is selectable through the number of items of information analyzed in the extrapolation. Thus, in considering the resources provided for analysis, in particular the computation power, and the required precision in the angle-of-rotation position resolution, an implementation optimized for the cost/benefit ratio may be developed.

In an advantageous refinement, the angular velocity and/or the change in angular velocity in the time range is extrapolated.

Extrapolation of the angular velocity and/or the change in angular velocity is advantageously performed in the frequency range. Assuming the curve of the angular velocity and/or the change therein is derived essentially by superimposing different oscillations, the curve may be estimated particularly well through such an extrapolation.

It is advantageous if a Fourier series is used for extrapolation in the frequency range, its coefficients being determined by a recursive method. The extrapolation may thus be performed with lower requirements on the whole regarding the resources needed. In addition, on the basis of the clearly predefined computation process, it is possible to make a precise determination regarding how much time will be needed to perform an extrapolation.

An advantageous embodiment is obtained when one point in time is assigned to each value determined for the crank angle.

When using a sensor wheel rotating with the shaft and having a tooth gap estimated, angular velocities are determined at the virtual positions for the teeth missing in the tooth gap. The method according to the present invention may thus also be used in a particularly simple manner in the area of the tooth gap.

Furthermore, the present invention relates to a device for determining the angle-of-rotation position of a shaft of an internal combustion engine, in particular the crank angle of a crankshaft, having a signaling device which indicates the rotation of the shaft on the basis of signals having an interval between them; having a detection device assigned to the signaling device and ascertaining information pertaining at least to incremental angles of rotation of the shaft and running times for each incremental angle of rotation; and having a memory which stores at least temporarily the incremental angle of rotation and running times; the device also having a logic circuit which determines the instantaneous angle-of-rotation position in the time period between two signals by extrapolation of the detected angle-of-rotation position, taking into account at least one angular velocity and/or change in angular velocity extrapolated from the stored information.

DETAILED DESCRIPTION

Figure 1:
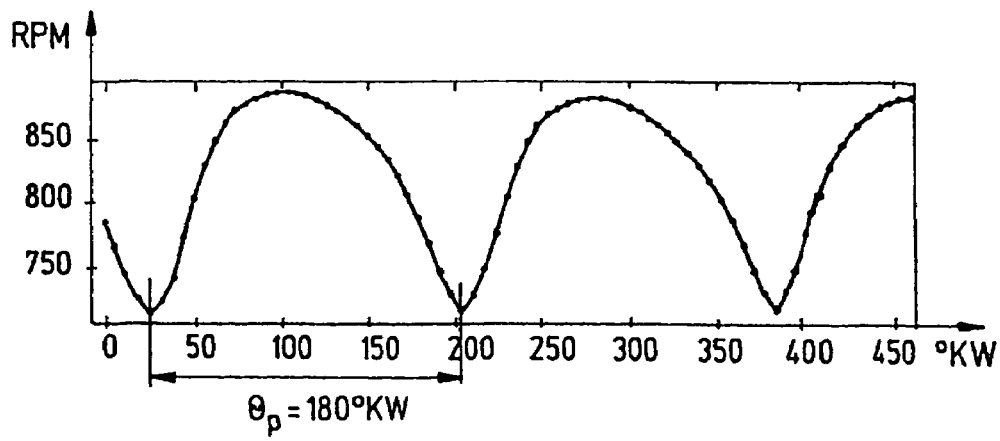
FIG. 1 shows a curve for the rotational speed of a crankshaft for a four-cycle internal combustion engine having four cylinders.

Instantaneous values for the angular velocity and/or the change in angular velocity are linked with values from past periods for performing the extrapolation. A period, as stated previously, may be defined in various ways. For the exemplary embodiment, the firing interval was selected as the period. FIG. 1 shows the curve of the rotational speed of the crankshaft for a four-cycle internal combustion engine having four cylinders. In the diagram shown there, the crank angle °KW is plotted in degrees on the abscissa and the instantaneous rotational speed rpm in revolutions per minute is plotted on the ordinate. The angle $\Theta_P$ represents the length of the period. In general, this angle $\Theta_P$ depends on the number of cylinders Z for a four-cycle engine as follows:

$$\Theta_P = \frac{720° \text{ KW}}{Z}.$$

The number of measured values per period $N_P$ is obtained in general as follows, where $\Delta\varphi$ represents the crank angle between two tooth signals:

$$N_P = \frac{\Theta_P}{\Delta\varphi}.$$

Figure 2:
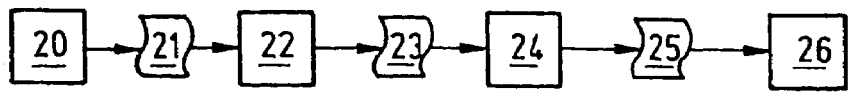
FIG. 2 shows the general sequence in performing the extrapolation.

The general sequence of determining the angular velocity and the points in time for the crank angles between the teeth of the sensor wheel is shown in FIG. 2, where $\Delta\alpha$ denotes the desired resolution in degrees of the crank angle (° crank angle, i.e., °KW) and the angle value to be extrapolated is defined by l. First in step 20 the tooth times $T_n$ of the sensor wheel are determined, i.e., the time needed by the crankshaft for revolution from tooth n−1 to the next tooth n is measured. In addition, procedures for achieving a greater precision of these tooth times may also be performed. Tooth times $T_n$ are then available as result 21, with which mean angular velocity $\overline{\omega}(n)$ is calculated in step 22 as follows:

$$\overline{\omega}(n) = \frac{\Delta\varphi}{T_n}.$$

If the change in mean angular velocity $\Delta\overline{\omega}(n)$ is needed, it is determined as follows in comparison with the last tooth:

$$\Delta\overline{\omega}(n) = \overline{\omega}(n) - \overline{\omega}(n-1)$$

These values are mean values for the corresponding tooth, which are then available as result 23. These may be assigned to the angle in the middle of the tooth, for example. The assigned angle for tooth n is given as $\phi_n$. Finally in step 24, the angular velocity and/or the change in angular velocity is extrapolated by one of the methods described below. After extrapolated values are available in the general form as result 25 $\tilde{\omega}(\phi_n + l \cdot \Delta\alpha)$, further processing is then performed in step 26.

First an extrapolation method is in the time range is discussed; in this method, the change in angular velocity is extrapolated. An expanded method, which better takes into account dynamic changes in engine speed, will then be described.

For extrapolation of the change in angular velocity in the time range, the corresponding value for the change in angular velocity of the last period $\Delta\overline{\omega}((n+1)-N_P)$ is used to linearly extrapolate the angular velocity until the next tooth signal on the basis of the instantaneous value of angular velocity $\overline{\omega}(n)$:

$$\tilde{\omega}(\varphi_n + l \cdot \Delta\alpha) = \overline{\omega}(n) + l \cdot \frac{\Delta\alpha}{\Delta\varphi} \cdot \Delta\overline{\omega}((n+1) - N_P).$$

If the angular velocity for value l=0 is based on the center of the last tooth, this must be taken into account in the extrapolation of the angular velocity. For the sensor wheel having 58 teeth mentioned as an example in the introduction, $\Delta\phi=6°$ if only one type of tooth signal, i.e., having a falling or rising edge, is taken into account. Therefore, in a desired resolution of one degree of crank angle (1°KW) the extrapolation would have to be performed from one tooth to the next up to and including l=8.

To better take into account dynamic changes in engine speed, this method may be expanded by adding a corresponding component for the rotational speed dynamics. A straight-line slope is calculated from the change in angular velocity of the last period and the last observed change in angular velocity. This straight-line slope is added to the change in angular velocity in the last period. To minimize the influence of short-term fluctuations, the mean of L values may be used for determining the straight-line slope. This yields the following equation for extrapolation of angular velocity:

$$\tilde{\omega}(\varphi_n + l \cdot \Delta\alpha) = \overline{\omega}(n) + l \cdot \frac{\Delta\alpha}{\Delta\varphi}$$

$$\left(\Delta\overline{\omega}((n+1) - N_P) + \frac{1}{L} \cdot \left(\sum_{i=n(L-1)}^{n} \Delta\overline{\omega}(i) - \sum_{i=n-(L-1)-N_P}^{n-N_P} \Delta\overline{\omega}(i)\right)\right)$$

Instead of carrying out a linear extrapolation of angular velocity and/or the change in angular velocity, multiple previous measured values for the angular velocity and/or the change in angular velocity may also be used to determine a functional dependence (e.g., in the form of a parabola) (e.g., by the least square fit method and/or the method of least error squares). This function is then used instead of the term $$l \cdot \frac{\Delta\alpha}{\Delta\varphi} \cdot \Delta\overline{\omega}((n+1) - N_P)$$

for the estimates.

Now the extrapolation method in the frequency range will be explained in greater detail. For this method, the angular velocity and/or the change in angular velocity is represented by a Fourier series, which is then used for the extrapolation. The coefficients of the Fourier series may be determined effectively by a recursive method.

Figure 3:
FIG. 3 shows the general sequence of extrapolation of the angular velocity in the frequency range.

FIG. 3 shows the individual steps for extrapolation of the angular velocity in the frequency range. At the beginning, result 23 is available with values $\overline{\omega}(n)$, $\Delta\overline{\omega}(n)$. Next in step 30, the coefficients for the Fourier series are calculated. This may be performed by using a recursive method, the instantaneous value of the angular velocity and the corresponding value of the last period being needed in addition to the coefficients of the last teeth. An expansion to the fifth order ($k \leq 5$) is sufficient for the required accuracy and due to the orders of the engine speed. However, a higher or lower order may of course also be selected. Angle $\phi_n$ denotes the crank angle assigned to tooth n.

$$a_0(n) = a_0(n-1) + \frac{2}{N_P}[\overline{\omega}(n) - \overline{\omega}(n - N_P)],$$

$$a_1(n) = a_1(n-1) + \frac{2}{N_P}[\overline{\omega}(n) - \overline{\omega}(n - N_P)] \cdot \cos\left(1 \cdot \frac{2\pi}{N_P \cdot \Delta\varphi} \cdot \varphi_n\right),$$

$$b_1(n) = b_1(n-1) + \frac{2}{N_P}[\overline{\omega}(n) - \overline{\omega}(n - N_P)] \cdot \sin\left(1 \cdot \frac{2\pi}{N_P \cdot \Delta\varphi} \cdot \varphi_n\right),$$

$$\ldots$$

$$a_k(n) = a_k(n-1) + \frac{2}{N_P}[\overline{\omega}(n) - \overline{\omega}(n - N_P)] \cdot \cos\left(k \cdot \frac{2\pi}{N_P \cdot \Delta\varphi} \cdot \varphi_n\right),$$

$$b_k(n) = b_k(n-1) + \frac{2}{N_P}[\overline{\omega}(n) - \overline{\omega}(n - N_P)] \cdot \sin\left(k \cdot \frac{2\pi}{N_P \cdot \Delta\varphi} \cdot \varphi_n\right)$$

Next a Fourier series may be developed for $\omega(\phi_n)$ from these coefficients (result 31):

$$\omega(\varphi_n) = \frac{a_0(n)}{2} + \sum_{k=1}^{m}\left[a_k(n) \cdot \cos\left(k \frac{2\pi}{N_P \cdot \Delta\varphi}\varphi_n\right) + b_k(n) \cdot \sin\left(k \frac{2\pi}{N_P \cdot \Delta\varphi}\varphi_n\right)\right]$$

Finally, this Fourier series is used in step 32 for the extrapolation of angular velocity $\tilde{\omega}(\phi_n + l \cdot \Delta\alpha)$ to then obtain result 33, which is needed for the remaining course and which corresponds to result 25 that was described above in general terms:

$$\tilde{\omega}(\varphi_n + l \cdot \Delta\alpha) = \frac{a_0(n)}{2} + \sum_{k=1}^{m}\left[a_k(n) \cdot \cos\left(k \cdot \frac{2\pi}{N_P \cdot \Delta\varphi}(\varphi_n + l \cdot \Delta\alpha)\right) + b_k(n) \cdot \sin\left(k \cdot \frac{2\pi}{N_P \cdot \Delta\varphi} \cdot (\varphi_n + l \cdot \Delta\alpha)\right)\right]$$

As in the extrapolation in the time range, another term may be added for taking into account dynamic changes in engine speed. As described above, this term may be determined from the straight-line slope between the instantaneous values of the angular velocity or the change in angular velocity and those of the previous period.

Figure 4:
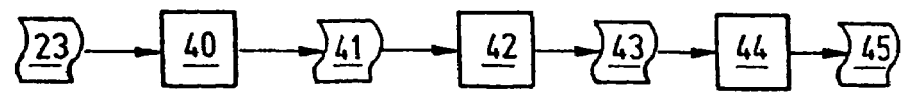
FIG. 4 shows the general sequence of extrapolation of the change in angular velocity in the frequency range.

FIG. 4 shows the individual substeps in extrapolation of the change in angular velocity in the frequency range using a Fourier series. Here again, result 23 with values $\overline{\omega}(n)$, $\Delta\overline{\omega}(n)$ is available at the beginning. As with the Fourier series for angular velocity, the coefficients of the Fourier series for the change in angular velocity may be determined by a recursive method in step 40:

$$a_0(n) = a_0(n-1) + \frac{2}{N_P}[\Delta\overline{\omega}(n) - \Delta\overline{\omega}(n - N_P)],$$

$$a_1(n) = a_1(n-1) + \frac{2}{N_P}[\Delta\overline{\omega}(n) - \Delta\overline{\omega}(n - N_P)] \cdot \cos\left(1 \cdot \frac{2\pi}{N_P \cdot \Delta\varphi} \cdot \varphi_n\right),$$

$$b_1(n) = b_1(n-1) + \frac{2}{N_P}[\Delta\overline{\omega}(n) - \Delta\overline{\omega}(n - N_P)] \cdot \sin\left(1 \cdot \frac{2\pi}{N_P \cdot \Delta\varphi} \cdot \varphi_n\right),$$

$$a_k(n) = a_k(n-1) + \frac{2}{N_P}[\Delta\overline{\omega}(n) - \Delta\overline{\omega}(n - N_P)] \cdot \cos\left(k \cdot \frac{2\pi}{N_P \cdot \Delta\varphi} \cdot \varphi_n\right),$$

$$b_k(n) = b_k(n-1) + \frac{2}{N_P}[\Delta\overline{\omega}(n) - \Delta\overline{\omega}(n - N_P)] \cdot \sin\left(k \cdot \frac{2\pi}{N_P \cdot \Delta\varphi} \cdot \varphi_n\right)$$

Again an expansion to the fifth order ($k \leq 5$) is sufficient for the required precision and due to the orders of the engine speed. Here again, however, a higher or lower order may of course also be selected. A Fourier series for $\Delta\omega(\phi_n)$ may subsequently be formulated from these coefficients as result 41:

$$\Delta\omega(\varphi_n) = \frac{a_0(n)}{2} + \sum_{k=1}^{m}\left[a_k(n) \cdot \cos\left(k \frac{2\pi}{N_P \cdot \Delta\varphi}\varphi_n\right) + b_k(n) \cdot \sin\left(k \frac{2\pi}{N_P \cdot \Delta\varphi}\varphi_n\right)\right]$$

This Fourier series is used in step 42 for the extrapolation of the change in angular velocity $\Delta\tilde{\omega}(\phi_n + l \cdot \Delta\alpha)$ which then yields result 43:

$$\Delta\tilde{\omega}(\varphi_n + l \cdot \Delta\alpha) = \frac{a_0(n)}{2} + \sum_{k=1}^{m}\left[a_k(n) \cdot \cos\left(k \cdot \frac{2\pi}{N_P \cdot \Delta\varphi} \cdot (\varphi_n + l \cdot \Delta\alpha)\right) + b_k(n) \cdot \sin\left(k \cdot \frac{2\pi}{N_P \cdot \Delta\varphi} \cdot (\varphi_n + l \cdot \Delta\alpha)\right)\right]$$

Finally in step 44 angular velocity $\tilde{\omega}(\phi_n + l \cdot \Delta\alpha)$ is determined as follows using the extrapolated values for the change in angular velocity (result 45, corresponding to general result 25):

$$\tilde{\omega}(\varphi_n + l \cdot \Delta\alpha) = \overline{\omega}(n) + \frac{\Delta\alpha}{\Delta\varphi} \cdot \sum_{j=1}^{l} \Delta\tilde{\omega}(\varphi_n + j \cdot \Delta\alpha)$$

Inserted this yields:

$$\tilde{\omega}(\varphi_n + l \cdot \Delta\alpha) =$$

$$\overline{\omega}(n) + \frac{\Delta\alpha}{\Delta\varphi} \cdot \sum_{j=1}^{l} \left\{ \frac{a_0(n)}{2} + \sum_{k=1}^{m} \left[ a_k(n)\cos\left(k \cdot \frac{2\pi}{N_P \cdot \Delta\varphi} \cdot (\varphi_n + j \cdot \Delta\alpha)\right) + b_k(n)\sin\left(k \cdot \frac{2\pi}{N_P \cdot \Delta\varphi} \cdot (\varphi_n + j \cdot \Delta\alpha)\right) \right] \right\}$$

For an efficient calculation of $\tilde{\omega}(\phi_n + l \cdot \Delta\alpha)$, the following recursive equation may be used:

$$\tilde{\omega}(\varphi_n + l \cdot \Delta\alpha) = \tilde{\omega}(\varphi_n + (l-1) \cdot \Delta\alpha) + \frac{\Delta\alpha}{\Delta\varphi} \cdot \Delta\tilde{\omega}(\varphi_n + l \cdot \Delta\alpha)$$

$$= \tilde{\omega}(\varphi_n + (l-1)\Delta\alpha) + \frac{\Delta\alpha}{\Delta\varphi} \cdot \left( \frac{a_0(n)}{2} + \sum_{k=1}^{m} \left[ a_k(n)\cos\left(k\frac{2\pi}{N_P \cdot \Delta\varphi} \cdot (\varphi_n + l \cdot \Delta\alpha)\right) + b_k(n)\sin\left(k\frac{2\pi}{N_P \cdot \Delta\varphi} \cdot (\varphi_n + l \cdot \Delta\alpha)\right) \right] \right)$$

To be able to better detect dynamic changes in engine speed, another term which reflects these changes in speed may additionally be used. As in the extrapolation method in the time range, the straight-line slope between the change in angular velocity of the previous period and the instantaneous value is determined. Furthermore, to determine the straight-line slope, the mean of multiple values may again be used instead of using individual values to minimize the effect of short-term fluctuations. This procedure is analogous to that described above.

The area of the tooth gap represents an extension of the sequences presented for the various extrapolation options, but the procedure described below is the same for all these options. In extrapolation from tooth to tooth gap, the values for the angular velocity and/or the change in angular velocity must be extrapolated further because the next tooth signal is generated only after the tooth gap. Thus the measured values for the missing teeth must be reconstructed. These are needed, for example, when measured values for the previous period, which are used to determine the Fourier coefficients, for example, fall in the area of a tooth gap. Reconstruction is performed by interpolation; the values of the missing teeth, which are closer to the last tooth before the tooth gap are extrapolated from this last value. The values for the remaining missing teeth are calculated from the measured value obtained via the tooth gap and the extrapolated measured values of the tooth gap. This principle is described in detail below for a gap of two teeth. The measured angular velocities for one tooth are allocated to the middle of this tooth. This method may be used analogously for a different allocation (e.g., to the end of a tooth).

Figure 5:
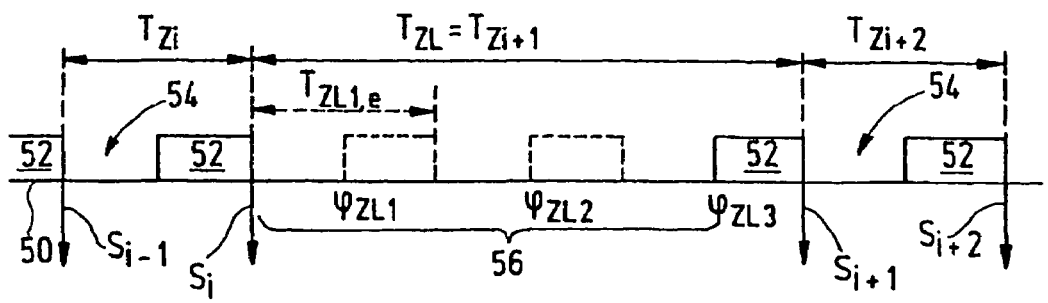
FIG. 5 shows the reconstruction of missing measured values with a sensor wheel having a tooth gap.

FIG. 5 shows how three values for the angular velocity are reconstructed in the case of a gap of two teeth. To simplify the diagram, the sequence of teeth 52, tooth spaces 54 and tooth gap 56 formed by removing the two teeth shown with dotted lines is shown here along a straight line 50. Arrows pointing vertically downward represent tooth signals $S_{i-1}$, $S_i$, $S_{i+1}$ and $S_{i+2}$ of teeth i−1, i, i+1 and i+2 (seen from left to right). The individual steps are as follows:

The first value of the angular velocity at crank angle $\phi_{ZL1}$ is determined using extrapolated period $T_{ZL1e}$ from the previous measured value (of tooth i):

$$\overline{\omega}(\varphi_{ZL1}) = \frac{\Delta\varphi}{T_{ZL1,e}}.$$

The mean value measured over the tooth gap is allocated to the mean value of the angular velocity at crank angle $\phi_{ZL2}$:

$$\overline{\omega}(\varphi_{ZL2}) = \frac{\Delta\varphi_{ZL}}{T_{ZL}}.$$

Finally, the value of the angular velocity at crank angle $\phi_{ZL3}$ is reconstructed as follows:

$$\overline{\omega}(\varphi_{ZL3}) = 2\frac{\Delta\varphi_{ZL}}{T_{ZL}} - \frac{\Delta\varphi}{T_{ZL1,e}}.$$

Next, according to the standard method without a tooth gap, the angular velocity may be determined using these reconstructed mean values for the angular velocity.

From the extrapolated values for the angular velocity, time may finally also be allocated to the values for the crank angle as follows:

$$t(\varphi_0 + n\Delta\varphi + l\Delta\alpha) = t_0 + \sum_{i=1}^{n} \frac{\Delta\varphi}{\overline{\omega}(i)} + \sum_{j=1}^{l} \frac{\Delta\alpha}{\tilde{\omega}(\varphi_n + j\Delta\alpha)}$$

for $n, l \geq 1$ where $t_0$ corresponds to the point in time at which the crank angle has assumed the value $\phi_0$. The points in time allocated to the crank angle are efficiently determined by the following recursions:

$$t_n = t(\varphi_0 + n\Delta\varphi) = t_{n-1} + \frac{\Delta\varphi}{\overline{\omega}(n)},$$

$$t_{n,l} = t(\varphi_0 + n\Delta\varphi + l\Delta\alpha) = t_n + \sum_{j=1}^{l} \frac{\Delta\alpha}{\tilde{\omega}(\varphi_n + j\Delta\alpha)}$$

$$= t_{n,l-1} + \frac{\Delta\alpha}{\tilde{\omega}(\varphi_n + l\Delta\alpha)}$$

Figure 6:
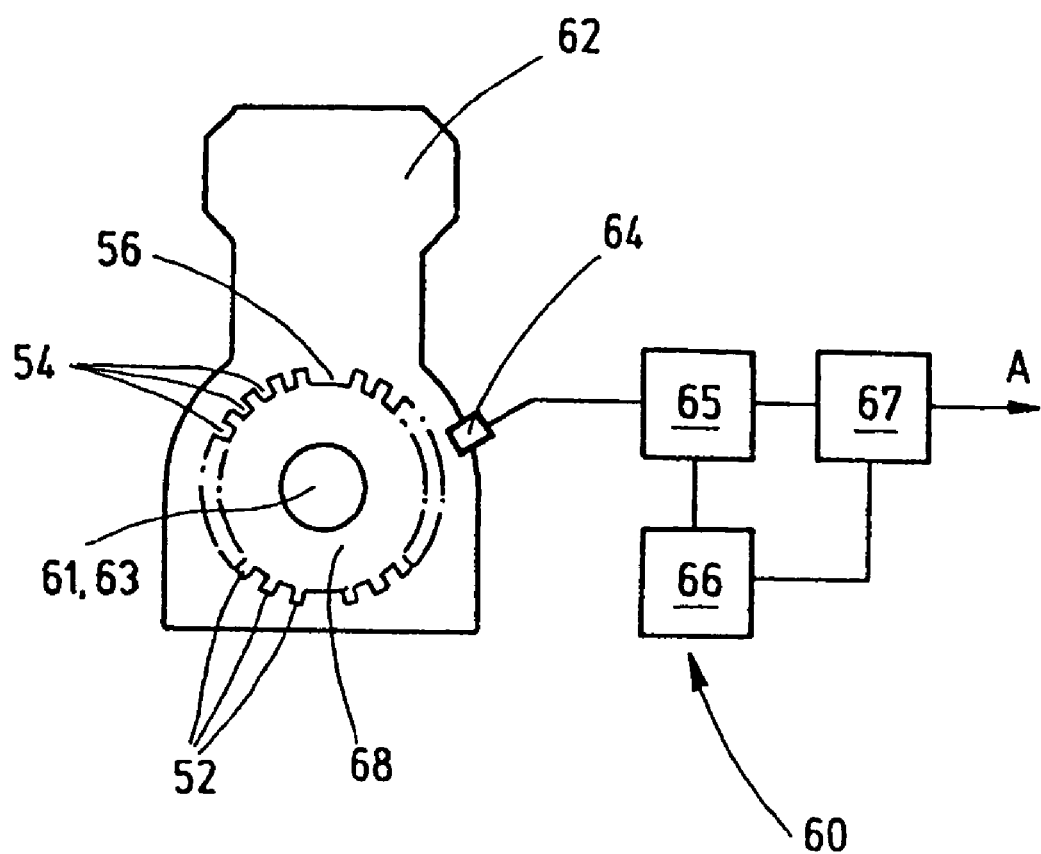
FIG. 6 shows a device for determining the angle-of-rotation position.

FIG. 6 shows a device 60 for performing a method according to the present invention. A sensor wheel 68 having teeth 52, tooth spaces 54 and a tooth gap 56 is situated in a rotationally fixed manner on a shaft 61 of an internal combustion engine 62, here a crankshaft 63. Sensor 20 is stationary with respect to internal combustion engine 10 [sic]. Signaling device 54 [sic; 64] detects the sequence of teeth 52 and tooth spaces 54 and/or gap 56 as they pass by and generates an incremental angle of rotation signal, i.e., tooth signal $S_i$. This signal is relayed to an analyzer unit 65 which sends a crank angle $\phi$ to memory 66 and also to logic circuit 67. Crank angle $\phi$ may then be queried by an engine control of engine 62, for example, at output A of logic circuit 67. If analyzer 65 has just received a tooth signal $S_i$, crank angle $\phi$ is known precisely and logic circuit 67 relays this information about crank angle $\phi$ directly to output A. In the period of time until the arrival of another tooth signal $S_{i+}$, logic circuit 67 determines crank angle $\phi$ on the basis of the method described here and relays the calculated information to output A. Thus precise information about crank angle $\phi$ is always available at output A even between tooth signals $S_i$.

What is claimed is:

1. A method for determining an angle-of-rotation position of a shaft of an internal combustion engine, comprising:
    detecting information about at least incremental angles of rotation of the shaft and running times for each incremental angle of rotation, the detecting being performed on the basis of signals that indicate a rotation of the shaft and are spaced with an interval between them and stored at least temporarily as stored information; and
    determining an instantaneous angle-of-rotation position in a period of time between two signals by extrapolation of the angle-of-rotation position thus detected, taking into account at least one of an angular velocity and a change in angular velocity extrapolated from the stored information.

2. The method as recited in claim 1, further comprising:
    forming mean values for at least one of the angular velocity and the change in angular velocity to reduce an influence of short-term fluctuations in a rotational speed.

3. The method as recited in claim 1, further comprising:
    defining an instantaneous period for sequences that repeat during operation of the internal combustion engine; and
    analyzing, for the extrapolation, information from at least one of the instantaneous period and at least one period in the past.

4. The method as recited in claim 3, further comprising:
    selecting the instantaneous period as one of a working cycle of the internal combustion engine, a crankshaft revolution, and a firing interval.

5. The method as recited in claim 1, wherein a desired angle-of-rotation position resolution is selectable through a number of items of information analyzed in the extrapolation.

6. The method as recited in claim 1, further comprising:
    performing the extrapolation of at least one of the angular velocity and the change in angular velocity in a time range.

7. The method as recited in claim 1, further comprising:
    performing the extrapolation of at least one of the angular velocity and the change in angular velocity in a frequency range.

8. The method as recited in claim 7, wherein the extrapolation is performed in accordance with a Fourier series whose coefficients are determined by a recursive method.

9. The method as recited in claim 1, further comprising:
    assigning a point in time to each of values determined for the angle-of-rotation position.

10. The method as recited in claim 1, further comprising:
    when using a sensor wheel that rotates with the shaft and has a tooth gap, determining estimated angular velocities at virtual positions for teeth missing in the tooth gap.

11. The method as recited in claim 1, wherein the angle-of-rotation position of the shaft includes a crank angle of a crankshaft.

12. A device for determining an angle-of-rotation position of a shaft of an internal combustion engine, comprising:
    a signaling device that indicates a rotation of the shaft on the basis of signals having time intervals between them;
    a detection device allocated to the signaling device and ascertaining information concerning at least incremental angles of rotation of the shaft and running times for each incremental angle of rotation;
    a memory for storing at least temporarily the incremental angles of rotation and the running times as stored information; and
    a logic circuit for determining an instantaneous angle-of-rotation position in a period of time between two signals by extrapolation of the angle-of-rotation position detected, the determining taking into account at least one of an angular velocity and a change in angular velocity extrapolated from the stored information.

13. The device as recited in claim 12, wherein the angle-of-rotation position of the shaft includes a crank angle of a crankshaft.

* * * * *